(12) United States Patent
Thorpe

(10) Patent No.: US 8,272,612 B2
(45) Date of Patent: Sep. 25, 2012

(54) CLIP

(76) Inventor: Edward Brian Thorpe, Miami, FL (US)

( * ) Notice: Subject to any disclaimer, the term of this patent is extended or adjusted under 35 U.S.C. 154(b) by 341 days.

(21) Appl. No.: 12/182,512

(22) Filed: Jul. 30, 2008

(65) Prior Publication Data

US 2009/0032035 A1 Feb. 5, 2009

Related U.S. Application Data

(60) Provisional application No. 60/952,902, filed on Jul. 31, 2007.

(51) Int. Cl.
*A47G 1/10* (2006.01)

(52) U.S. Cl. ............. 248/316.7; 248/316.5; 248/231.51; 248/229.13; 248/229.16; 248/230.7; 24/455; 24/489; 24/336; 24/339; 269/37; 269/45

(58) Field of Classification Search ............... 248/316.7, 248/689, 229.1, 229.13, 229.16, 276.1, 316.5; 248/229.23, 228.4, 230.4, 231.51, 230.7; 24/455, 489, 499, 336, 339; 269/6, 37, 45
See application file for complete search history.

(56) References Cited

U.S. PATENT DOCUMENTS

| | | | |
|---|---|---|---|
| 252,753 A | 1/1882 | Fitzgerald | |
| 884,256 A | 4/1908 | Addie | |
| 1,466,057 A | 8/1923 | Mathews | |
| 1,684,347 A | 9/1928 | Dobbs | |
| 2,506,666 A | 5/1950 | Graham | |
| 2,580,985 A | 1/1952 | Wooden | |
| 2,931,365 A | 4/1960 | McKenzie | |
| 3,149,390 A | 9/1964 | McCoy | |
| D214,273 S | 5/1969 | Bricker | |
| 4,943,039 A * | 7/1990 | Jackson | 269/45 |
| D350,892 S | 9/1994 | Sorensen | |
| 5,381,989 A * | 1/1995 | Jackson | 248/231.51 |
| 5,655,270 A * | 8/1997 | Boisvert | 24/336 |
| 5,706,832 A | 1/1998 | Gold | |
| 5,868,143 A | 2/1999 | Nielsen | |
| 6,056,282 A * | 5/2000 | Desmarais | 269/37 |
| D433,318 S | 11/2000 | Chang | |
| D442,047 S | 5/2001 | Hicks | |
| 6,357,710 B1 * | 3/2002 | Fielden et al. | 248/276.1 |
| D457,409 S | 5/2002 | Noniewicz | |
| D470,029 S | 2/2003 | Wolff | |
| 6,983,930 B1 * | 1/2006 | La Mendola et al. | 269/45 |
| 7,766,313 B2 * | 8/2010 | Panosian | 269/37 |
| 2005/0098932 A1 * | 5/2005 | Panosian | 269/37 |

\* cited by examiner

*Primary Examiner* — Ramon Ramirez
*Assistant Examiner* — Todd M Epps
(74) *Attorney, Agent, or Firm* — Heslin Rothenberg Farley & Mesiti P.C.

(57) ABSTRACT

A clip for holding an object on a supporting member comprises a holding clamp and an attaching clamp. The holding clamp has a pair of clamping members with oppositely bowed gripping portions and inwardly arched handles. The oppositely bowed gripping portions form together, when engaged, jaws for holding an object such as a cigar. The jaws are connected together for pivotal movement to cooperate with each other for clamping action upon actuation of their handles. At the juncture point of the jaws with the handles, the clamping members are provided with aligned, apertured supports for receipt of an axial binding post or rivet that extends through the apertures and for holding the clamping members together and in axial alignment. A spring, normally biasing the clamping members towards a closed position is looped around the post with its ends locked against the handles. At the ends of the handles, in the flat portions thereof, the two clamping members are riveted together, and in such manner that the clamping members can rotate 360 degrees in a circle relative to one another. In this way the clamping members can be positioned in straight-line fashion, or rotated at any angle relative to one another.

20 Claims, 2 Drawing Sheets

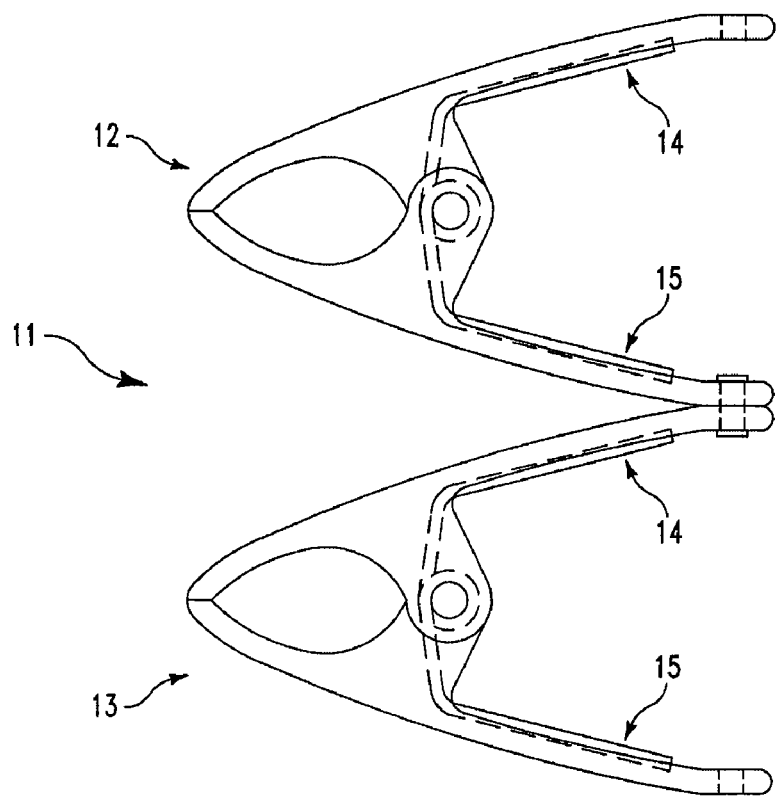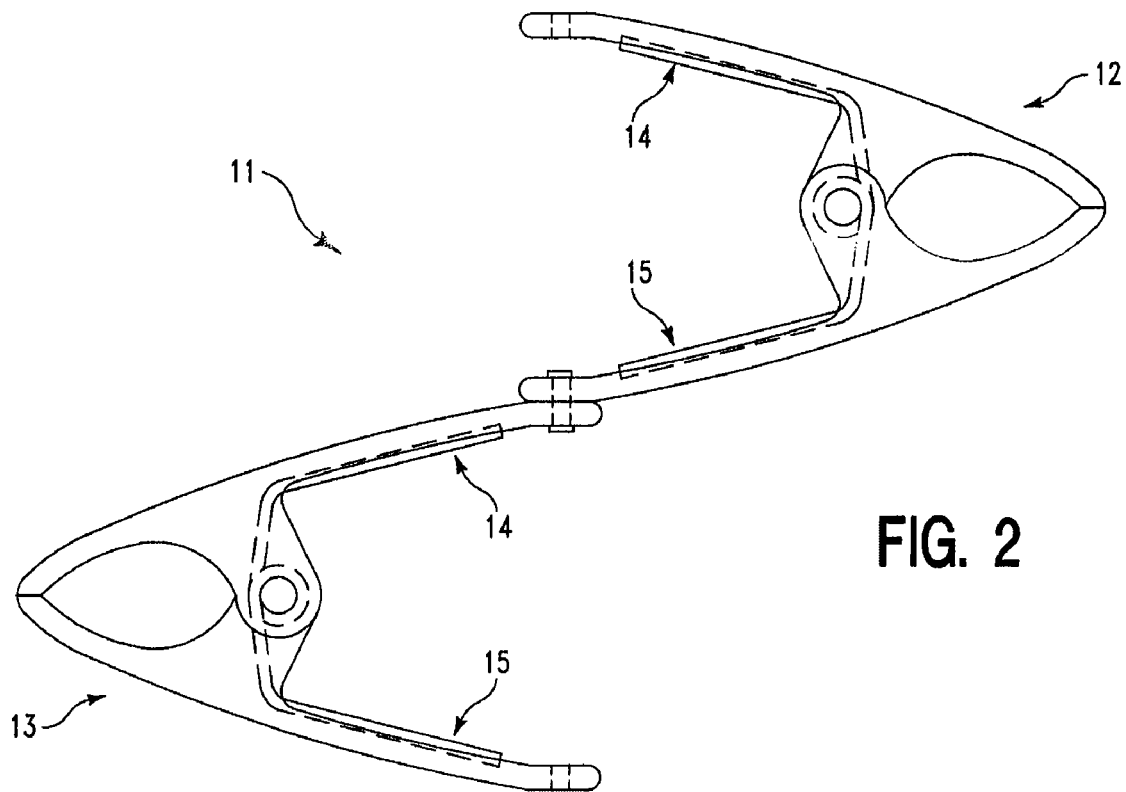

CLIP

CROSS-REFERENCE TO RELATED APPLICATION

The present application is related to Provisional Application Ser. No. 60/952,902 filed Jul. 31, 2007. This prior application is incorporated herein by this reference and the benefit of its filing date is claimed herein as well.

FIELD OF THE INVENTION

The present invention relates to a clip for holding objects. While the invention may be used for holding many objects such as pens, pencils and the like, it is particularly useful in holding cigars for attachment to a golf cart.

DESCRIPTION OF THE PRIOR ART

Cigar or cigarette holders are well known in the prior art. By way of example, Fitzgerald, U.S. Pat. No. 252,753 is an early description of a device for holding a cigar or a cigarette.

Wooden, U.S. Pat. No. 2,580,985 relates to a device that can carry a lit cigarette and be detachably mounted to a golf cart.

McKenzie, U.S. Pat. No. 2,931,365, describes a cigarette, cigar or pipe holder to be clipped onto a golf bag.

Gold, U.S. Pat. No. 5,706,832, discloses a cigar holder that can be attached to a golf cart.

Nielsen, U.S. Pat. No. 5,868,143, discloses a cigar or cigarette holder that can be slid onto a golf bag.

SUMMARY OF THE INVENTION

An object of the present invention is an improved cigar holder or clip for attachment to a golf cart.

Another object is such a clip that can be oriented in a number of positions for the convenience of the user.

These and other objects, features and advantages are accomplished in accordance with the teachings of the present invention, one illustrative embodiment of which comprises: a clip for holding an object on a supporting member comprising a holding clamp and an attaching clamp. The holding clamp has a pair of clamping members and inwardly arched handles. The clamping members have oppositely bowed gripping portions that form together, when engaged, jaws for holding an object such as a cigar. The jaws are connected together for pivotal movement to cooperate with each other for clamping action upon actuation of their handles. At the juncture point of the jaws with the handles, the clamping members are provided with aligned, apertured supports for receipt of an axial binding post or rivet that extends through the apertures and for holding the clamping members together and in axial alignment. A spring, normally biasing the clamping members towards a closed position is looped around the post with its ends locked in openings (not shown) in supports on either side. At the ends of the handles, in the flat portions thereof, the two clamping members are riveted together, and in such manner that the clamping members can rotate 360 degrees in a circle relative to one another. In this way the clamping members can be positioned in straight-line fashion, or rotated at any angle relative to one another.

BRIEF DESCRIPTION OF THE DRAWINGS

Other objects, features and advantages of the present invention will be apparent from the following detailed description and accompany drawing, wherein:

FIG. 1 is a side view of the clip of the present invention with its attached clamps and in side-by-side position;

FIG. 2 is a side view of the clip of FIG. 1, but with the clamps in extended position;

DETAILED DESCRIPTION OF THE INVENTION

Figure 3:
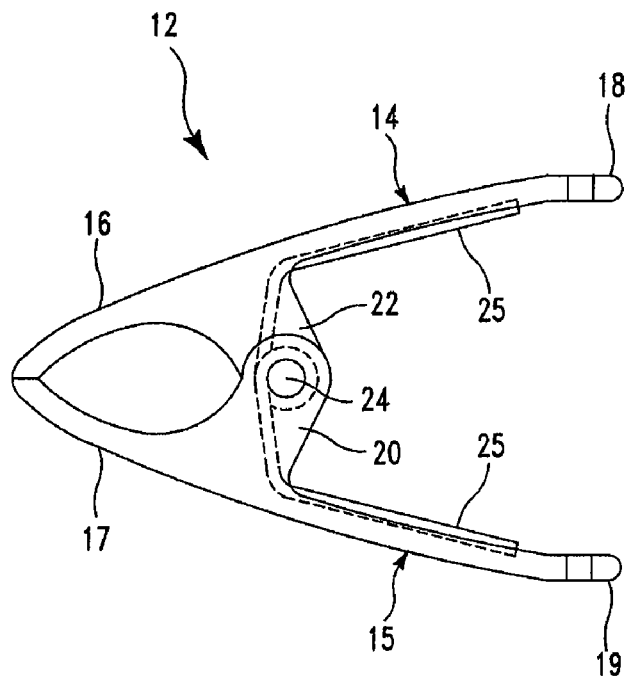
FIG. 3 is a side view of one of the clamps of the clip of the present invention.
Figure 4:
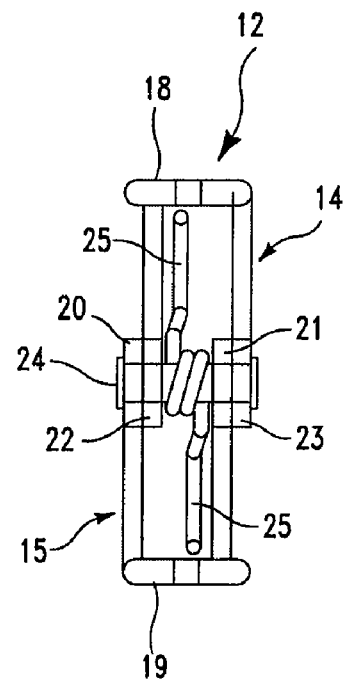
FIG. 4 is a view of the clamp of FIG. 3, looking in from the right side.
Figure 5:
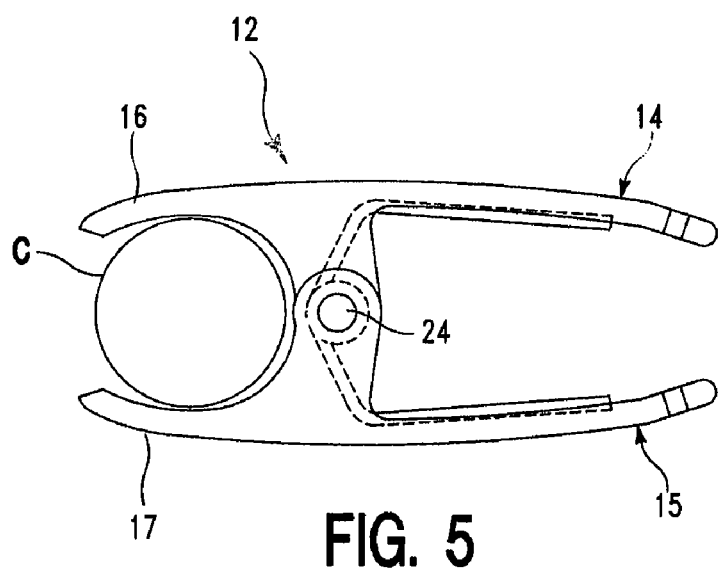
FIG. 5 is a side view of the clamp of FIG. 3, but in open position.

Referring now to FIGS. 1 through 5 of the drawing, there is shown a clip 11 for holding an object on a supporting member comprising a holding clamp 12 and an attaching clamp 13.

The various pieces comprising the clip 11 are preferably of anodized aluminum that will not corrode or rust.

The holding clamp 12 is seen as having a pair of clamping members 14, 15. Clamping members 14, 15 are seen as having oppositely bowed gripping portions 16, 17 and inwardly arched handles 18, 19. Gripping portions 16, 17, form together, when engaged, jaws for holding an object such as a cigar C (FIG. 5) and shall be referred to as such hereafter. The handles 18, 19 are so designed that one can get a solid grip on the clamp 12 and one's fingers will not slip off when the clamp 12 is opened.

The jaws 16, 17 are connected together for pivotal movement to cooperate with each other for clamping action upon actuation of the handles 18, 19. At the juncture point of the jaws 16, 17 with the handles 18, 19, the clamping members 14, 15 are provided with aligned, apertured supports 20, 21, 22, 23 for receipt of an axial binding post or rivet 24 that extends through the apertures and for holding the clamping members 14, 15 together and in axial alignment. A spring 25, normally biasing the clamping members 14, 15 towards a closed position is looped around the post 24, with its ends locked against and within the handles.

The attaching clamp 13 is constructed in identical fashion as the holding clamp 12 and will not be described in detail.

At the ends of the handles (19 in the case of clamping member 15), in the flat portions thereof, the two clamping members 12, 13 are riveted together, and in such manner that the clamping members can rotate 360 degrees in a circle relative to one another. In this way the clamping members 12, 13 can be positioned in straight-line fashion, as depicted in FIG. 2 of the drawing, or rotated at any angle relative to one another such as at ninety degrees.

In use, one simply clamps one of the clamping members to a supporting structure such as a golf cart and places his cigar in the jaws of his other clamping member. It is easy to use and carry. Prior to use it can be placed in one's golf bag or pocket. It is easy to place on a golf cart and saves one's golf bag or cart from burn marks. When used there is no problem with pesticides, fertilizers or wet grass.

Wherever the clip is used, the clamping members may be positioned in such manner that the cigar is always in a horizontal position giving the cigar an even burn.

The smooth interior of the jaws prevents tearing of the cigar.

While described primarily as a cigar clip it can act as a multipurpose clip for almost any application and clips on in almost any position or surface. It can secure to almost anything, to secure utensils, books or caps, gloves or towels to a golf cart, and is useful on boats, motorcycles, etc.

Logos are easily displayed and highly visible on the handles. It would be a great gift or prize by itself or along with a cigar cutter and lighter.

It should be obvious that changes, additions and omissions may be made in the details and arrangement of parts without departing from the spirit and scope of the invention as hereinafter claimed.

What is claimed is:

1. A clip for holding an object on a supporting member, comprising:
 a holding clamp having a pair of clamping members, of the pair of clamping members having
  oppositely bowed gripping portions, each gripping portion of said gripping portions having
   a handle monolithically formed with the gripping portion,
  the oppositely bowed gripping portions forming together, when engaged, jaws for holding an object, the jaws having smooth interior surfaces,
  a non-removable, axial binding post,
  the clamping members permanently mounted on and being pivotable about the axial binding post,
  a spring mounted about the post for biasing the jaws in a normally closed position;
 an attaching clamp having a pair of clamping members, the pair of clamping members having
  oppositely bowed gripping portions, each gripping portion of said gripping portions having
   a handle monolithically formed with the gripping portion,
  the oppositely bowed gripping portions forming together, when engaged, jaws for holding an object,
  a non-removable, axial binding post,
  the clamping members permanently mounted on and being pivotable about the axial binding post,
  a spring mounted about the post for biasing the jaws in a normally closed position; and,
 a handle of a clamping member of the pair of clamping members of the holding clamp being directly connected to a handle of a clamping member of the pair of clamping members of the attaching clamp, to allow 360 degree rotation of the clamps relative to one another such that outer surfaces of the directly connected handles are in contact with each other throughout the 360 degree rotation of the clamps.

2. A clip for attaching an object to a supporting member, comprising:
 a holding clamp including:
  a first clamping member including a first gripping portion with an exterior surface and a first smooth arcuate interior jaw surface, and a first handle portion with an interior surface and an exterior surface monolithically formed with the first gripping portion;
  a second clamping member including a second gripping portion with an exterior surface and a second smooth arcuate interior jaw surface oppositely arced as compared to the first smooth arcuate interior jaw surface for holding an object therebetween, and a second handle portion with an interior surface and an exterior surface monolithically formed with the second gripping portion;
  a first axial binding post pivotably coupling the first and second clamping members about a first axis of rotation; and
  a first spring mounted about the axial binding post and interacting with the first and second clamping members and biasing the first and second smooth interior jaw surfaces of the first and second gripping portions toward one another and the interior surfaces of the first and second handle portions away from one another; and
 an attaching clamp including:
  a third clamping member including a third gripping portion with an exterior surface and a third arcuate interior jaw surface, and a third handle portion with an interior surface and an exterior surface monolithically formed with the third gripping portion;
  a fourth clamping member including a fourth gripping portion with an exterior surface and a fourth arcuate interior jaw surface oppositely arced as compared the third arcuate interior jaw surface for holding a supporting member therebetween, and a fourth handle portion with an interior surface and an exterior surface monolithically formed with the fourth gripping portion;
  a second axial binding post pivotably coupling the third and fourth clamping members about a second axis of rotation; and
  a second spring mounted about the axial binding post and interacting with the third and fourth clamping members and biasing the third and fourth interior jaw surfaces toward one another and the interior surfaces of the third and fourth handle portions away from one another, and
 wherein the exterior surface of the second handle portion of the holding clamp and the exterior surface of the third handle portion of the attaching clamp are rotatably coupled to allow 360 degree rotation of the clamps relative to one another about a third axis of rotation, and wherein the second handle portion of the holding clamp and the third handle portion of the attaching clamp are substantially restricted from any movement relative to one another other than about the third axis of rotation.

3. The clip of claim 2, wherein each of the first, second, third and fourth handle portions include a distal end that defines a distal end of the corresponding clamp, wherein each gripping portion defines a proximate end that defines a proximate end of the corresponding clamp, and wherein the second handle portion of the holding clamp and the third handle portion of the attaching clamp are rotatably coupled at distal portions thereof.

4. The clip of claim 3, wherein a distal portion of the outer surface of the second handle portion of the holding clamp is adjacent a distal portion of the outer surface of the third handle portion of the attaching clamp throughout 360 degree rotation of the clamps about the third axis of rotation.

5. The clip of claim 4, wherein the distal portions of the second handle portion of the holding clamp and the third handle portion of the attaching clamp are substantially planar.

6. The clip of claim 5, wherein a portion of the distal substantially planar outer surface about the third axis of rotation of the second handle portion of the holding clamp is in abutment with a portion of the distal substantially planar outer surface about the third axis of rotation of the third handle portion of the attaching clamp throughout 360 degree rotation of the clamps about the third axis of rotation.

7. The clip of claim 6, wherein the portion of each of the first, second, third and fourth handle portions of the holding clamp extending between the distal substantially planar portions and the gripping portions are bowed.

8. The clip of claim 7, wherein the substantially planar distal portion of the second handle portion of the holding clamp and the substantially planar distal portion of the third handle portion of the attaching clamp are rotatably coupled by a rivet member passing through the planar distal portion of the second handle portion of the holding clamp and the planar distal portion of the third handle portion of the attaching clamp.

9. The clip of claim 8, wherein the rivet member extends substantially perpendicularly through the substantially planar distal portion of the second handle portion of the holding clamp and the substantially planar distal portion of the third handle portion of the attaching clamp.

10. The clip of claim 6, wherein the clip is configured such that the first and second axes of rotation are substantially parallel, and wherein the first and second axes of rotation are fixed at a particular angle and distance with respect to the third axis of rotation.

11. The clip of claim 6, wherein the outer surface of the distal planar portion of the second handle portion of the holding clamp and the outer surface of the distal substantially planar portion of the third handle portion of the attaching clamp are not manually engageable.

12. The clip of claim 11, wherein the inner surface of the distal substantially planar portion of the third handle portion of the attaching clamp and the outer surface of the distal substantially planar portion of the first handle portion of the holding clamp are manually engageable to overcome the bias of the first spring to rotate the first and second clamping members about the first axis of rotation to move the first and second interior jaw surfaces of the first and second gripping portions away from one another.

13. The clip of claim 12, wherein the inner surface of the distal substantially planar portion of the second handle portion of the holding clamp and the outer surface of the distal substantially planar portion of the fourth handle portion of the attaching clamp are manually engageable to overcome the bias of the second spring to rotate the third and fourth clamping members about the second axis of rotation to move the third and fourth interior jaw surfaces of the third and fourth gripping portions away one another.

14. A clip for attaching an object to a supporting member, comprising:
   a holding clamp including:
      a first clamping member including a first gripping portion with an exterior surface and a first smooth arcuate interior jaw surface, and a first handle portion with an interior surface and an exterior surface monolithically formed with the first gripping portion;
      a second clamping member including a second gripping portion with an exterior surface and a second smooth arcuate interior jaw surface oppositely arced as compared to the first smooth arcuate interior jaw surface for holding an object therebetween, and a second handle portion with an interior surface and an exterior surface monolithically formed with the second gripping portion;
      a first axial binding post pivotably coupling the first and second clamping members about a first axis of rotation; and
      a first spring mounted about the axial binding post and interacting with the first and second clamping members and biasing the first and second smooth interior jaw surfaces of the first and second gripping portions toward one another and the interior surfaces of the first and second handle portions away from one another; and
   an attaching clamp including:
      a third clamping member including a third gripping portion with an exterior surface and a third arcuate interior jaw surface, and a third handle portion with an interior surface and an exterior surface monolithically formed with the third gripping portion;
      a fourth clamping member including a fourth gripping portion with an exterior surface and a fourth arcuate interior jaw surface oppositely arced as compared the third arcuate interior jaw surface for holding a supporting member therebetween, and a fourth handle portion with an interior surface and an exterior surface monolithically formed with the fourth gripping portion;
      a second axial binding post pivotably coupling the third and fourth clamping members about a second axis of rotation; and
      a second spring mounted about the axial binding post and interacting with the third and fourth clamping members and biasing the third and fourth interior jaw surfaces toward one another and the interior surfaces of the third and fourth handle portions away from one another, and
   wherein an abutting portion of the exterior surface of the second handle portion of the second clamping member of the holding clamp and an abutting portion of the exterior surface of the third handle portion of the third clamping member of the attaching clamp are in abutment, and wherein the second clamping member of the holding clamp and the third clamping member of the attaching clamp are directly rotatably coupled at the abutting portions of the second clamping member and the third clamping member to allow 360 degree rotation of the holding and attaching clamps relative to one another about a third axis of rotation.

15. The clip of claim 14, wherein the abutting exterior portions of the second clamping member and the third clamping member are substantially planar, and wherein the remaining exterior portions of the second clamping member and the third clamping member are substantially non-planar.

16. The clip of claim 15, wherein the third axis of rotation is substantially normal to the adjacent substantially planar exterior portions of the second clamping member and the third clamping member.

17. The clip of claim 14, wherein the second clamping member and the third clamping member are substantially restricted from any movement relative to one another other than about the third axis of rotation.

18. The clip of claim 14, wherein the abutting exterior portions of the second clamping member and the third clamping member are in substantial contact throughout the 360 degree rotation of the clamps.

19. The clip of claim 14, wherein the abutting exterior portions of the second clamping member and the third clamping member are located at respective ends of the second handle portion and the third handle portion.

20. The clip of claim 14, wherein the second clamping member and the third clamping member are directly rotatably coupled by a rivet that defines the third axis of rotation.

* * * * *